United States Patent Office 3,037,053
Patented May 29, 1962

3,037,053
PROCESS OF PRODUCING 5-METHYLENECYCLO-
PENTANONE-3-CARBOXYLIC ACID
Sumio Umezawa, 25 Kita-4-chome, Toyotama,
Nerimaku, Tokyo, Japan
No Drawing. Filed Aug. 28, 1957, Ser. No. 680,676
Claims priority, application Japan Oct. 6, 1956
1 Claim. (Cl. 260—514)

This invention relates to certain 5-methylene-cyclopentanone-3-carboxylic acids and their salts and esters which exhibit valuable antibacterial and antifungal activity.

There is provided by the present invention the acids having the formula

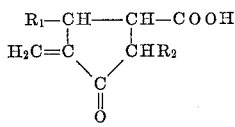

where $R_1$ and $R_2$ represent hydrogen or lower alkyl and at least one of $R_1$ and $R_2$ is hydrogen, and the metal, ammonium and substituted ammonium salts thereof and the lower alkyl esters thereof. The preferred embodiments of the present invention are the compounds wherein both $R_1$ and $R_2$ are hydrogen.

There is further provided by the present invention the stepwise process of reacting an acid having the formula

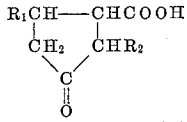

wherein $R_1$ and $R_2$ each represent a member selected from the group consisting of hydrogen and lower alkyl and at least one of $R_1$ and $R_2$ represent hydrogen, with formaldehyde and a secondary amine in a Mannich reaction, esterifying the resultant acid to produce a lower alkyl ester, heating the ester in vacuo to distill a 5-methylene-cyclopentanone-3-carboxylic acid ester and subsequently hydrolyzing said ester to produce the corresponding member selected from the group consisting of an acid having the formula.

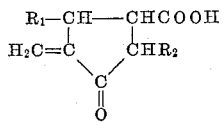

where $R_1$ and $R_2$ each represent a member selected from the group consisting of hydrogen and lower alkyl and at least one of $R_1$ and $R_2$ is hydrogen.

In addition to the free acids of the above formulae, there are included within the present invention their salts with alkal metals, such as lithium, sodium and potassium, the salts of the acids with alkaline earth metals such as calcium, strontium and barium and the salts of the acids with other metals such as beryllium, magnesium, zinc, cadmium, aluminum, tin, lead, antimony, chromium, manganese, iron, cobalt, nickel, copper silver and gold. These salts are prepared by neutralizing one equivalent of the salts with one equivalent of the metal hydroxide or other base (e.g. ethoxide) in solution in water or an organic solvent; the salts thus formed are recovered by collection by filtration in the case of insoluble salts, or by removal of the liquid medium by lyophilization or distillation in vacuo. These salts are useful in manufacturing procedures, e.g. to facilitate recovery and purification. In like manner, there are included within the scope of the present invention the salts of the acids with ammonia, primary amines, secondary amines and tertiary amines, such as methylamine, dimethylamine or trimethylamine and also including more complex amines such as procaine and dehydroabietylamine. In like manner there are included within the scope of the present invention the esters of the salts and particularly esters of lower alphatic alcohols, such as methanol (prepared by reaction with an excess of diazomethane) and ethanol, but also including esters of phenols and enols.

The compounds of the present invention are useful as intermediates in organic synthesis, e.g. of substituted cyclopentylamines, substituted alcohols, substituted thiosemicarbazones, hydrazides and other ketone derivatives as industrial or agricultural fungicidal agents, and as plasticizers for vinyl chloride polymers, copolymers and the like. The compounds of the present invention are particularly useful in polymerization reactions and for use in the Diels-Alder reaction or "diene" synthesis by reaction with compounds such as cyclopentadiene to form adducts useful to the polymer industry.

The general process for producing the compounds of the present invention may be illustrated as follows in terms of the preferred embodiment:

The synthetic route of this invention is as follows:

CHART I

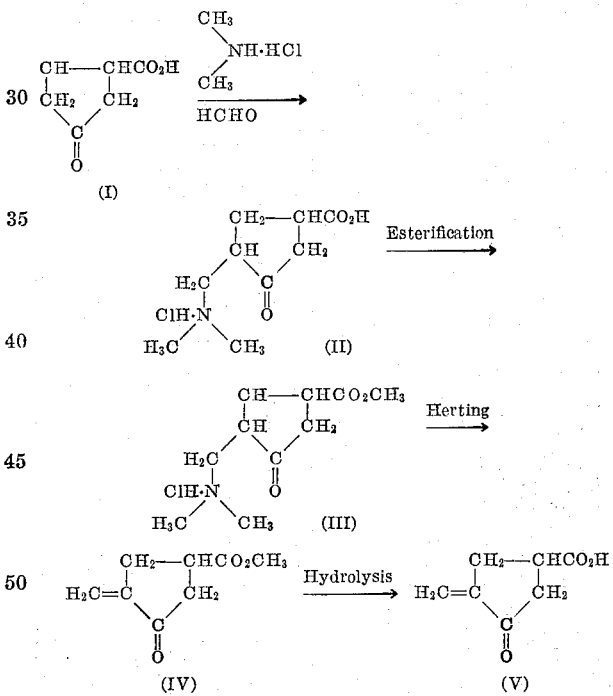

A mixture of cyclopentanone-3-carboxylic acid, paraformaldehyde and dimethylamine hydrochloride was fused to yield a Mannich base hydrochloride (II). The reaction by which II is obtained from I belongs to so-called Mannich reaction. Therefore, not only dimethylamine hydrochloride but also primary amine, secondary amine and ammonia can be used generally. Moreover, this reaction (I→II) can be applied generally to cyclopentanone-carboxylic acid compounds which contain the group —$CH_2$—CO— in their structure.

Next, esterification of the Mannich base hydrochloride (II) by a general procedure yields an ester hydrochloride (III). Methyl ester, ethyl ester and so on can be easily prepared by a general procedure.

Degradation of the ester hydrochloride (III) by vacuum distillation yields the ester (IV) of 5-methylenecyclopentanone-3-carboxylic acid. Finally, mild hydrolysis of the ester (IV) by a general procedure afforded 5-methylenecyclopentanone-3-carboxylic acid (V).

Structural proof of IV and V was obtained as follows: In reaction I→II there are two positions at which dimethylaminomethyl-group is to be introduced, that is two α-positions to carbonyl group of I. Hence, the position of methylene-group in the methylenecyclopentanone-3-carboxylic acid which is prepared by the synthetic route of this invention must be proved experimentally. The inventor has proved the position of the methylene-group to be at C–5 experimentally by the reaction sequence shown in the following Chart II.

CHART II

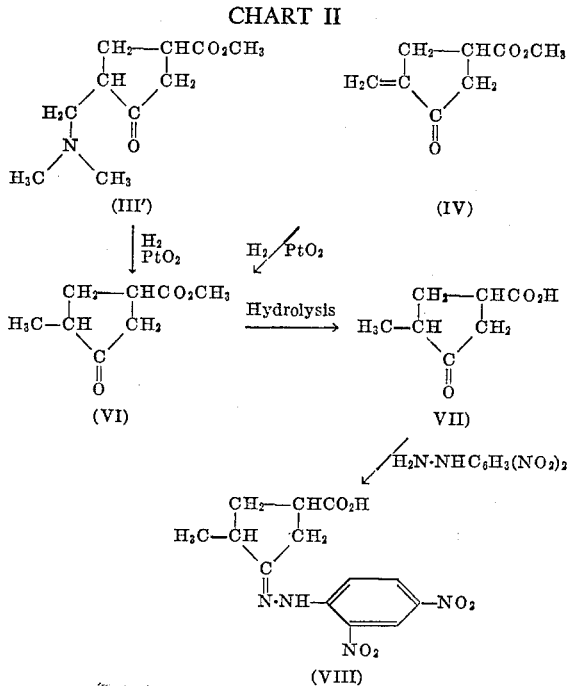

Hydrogenation of the ester of methylenecyclopentanone-3-carboxylic acid (IV) with platinum oxide catalyst gave the ester of 5-methylcyclopentanone-3-carboxylic acid (VI). Moreover, catalytic hydrogenolysis of free Mannich base (III'), which was obtained from III by treatment with ammonia, afforded also VI. Hydrolysis of VI gave 5-methylcyclopentanone-3-carboxylic acid (VII), which was already described by E. Hope and W. H. Perkin, Jr. (J. Chem. Soc., 99, 762–775 (1911)). This inventor has synthesized 5-methylcyclopentanone-3-carboxylic acid by the route of Hope and Perkin and prepared its 2,4-dinitrophenylhydrazone, which is identical with the 2,4-dinitrophenylhydrazone of VII synthesized by the route of this invention. Consequently, the structure of V has been proven.

5-methylenecyclopentanone-3-carboxylic acid (V) and its esters which are prepared by the synthetic sequence of this invention showed significant antibacterial and antifungal activities, as described later.

The synthetic route of this invention is illustrated in detail by the following example:

EXAMPLE

*Preparation of 5-Methylenecyclopentanone-3-Carboxylic Acid (V)*

(1) PREPARATION OF 5-DIMETHYLAMINOMETHYL-CYCLOPENTANONE-3-CARBOXYLIC ACID HYDROCHLORIDE (II)

Cyclopentanone-3-carboxylic acid which is used as the starting material can be synthesized by the route of F. W. Kay and W. H. Perkin (J. Chem. Soc., 89, 1643 (1906)).

*Procedure A.*—A mixture of 5.0 g. of cyclopentanone-3-carboxylic acid, 3.2 g. of dimethylamine hydrochloride, was warmed on a water bath. To the resulting melt was added 1.18 g. of paraformaldehyde and then the mixture was stirred at 75–80° C. for three hours and then evaporated under reduced pressure. The resulting syrup was dissolved in 10 cc. of hot absolute ethanol and a small amount of insoluble solid was removed by filtration. The solution was allowed to stand overnight in a refrigerator to separate the crystalline hydrochloride of Mannich base, which was filtered and washed with absolute ethanol and dried; yield 2 g. (23%), M.P. 136–138° C. (dec.). Two recrystallizations from methanol afforded an analytical sample, M.P. 147–148° C. (dec.), as a colorless prism.

*Analysis.*—Found: C, 48.51; H, 6.91; N, 6.14. Calculated for $C_9H_{16}O_3NCl$: C, 48.40; H, 7.22; N, 6.32%.

*Procedure B.*—A mixture of 2.0 g. of cyclopentanone-3-carboxylic acid, 1.2 cc. of aqueous 39% formaldehyde and 1.27 g. of dimethylamine hydrochloride was warmed at 75° C. for four hours. The initial odor of formaldehyde disappeared. The resulting clear solution was evaporated under reduced pressure to give a viscous, pale-yellow oil, which was redissolved in 10 cc. of absolute ethanol by gentle warming and allowed to crystallize overnight in a refrigerator. The yield of crude crystals was 0.8 g. On recrystallization from absolute methanol, an analytical sample of 5-dimethylaminomethylcyclopentanone-3-carboxylic acid hydrochloride of M.P. 146–147° C. (dec.) was obtained; yield 500 mg. (14%). When mixed with a sample prepared by procedure A described above, the melting point was unchanged.

(2) PREPARATION OF METHYL 5-DIMETHYLAMINO-METHYLCYCLOPENTANONE - 3 - CARBOXYLATE HYDROCHLORIDE (III)

A mixture of 1.7 g. of 5-dimethylaminomethylcyclopentanone-3-carboxylic acid hydrochloride (I) and 80 cc. of absolute methanol was saturated with dry hydrogen chloride and allowed to stand overnight. The methanol was removed by distillation at about 40° C. under reduced pressure and the residue was dried in a desiccator. The resulting crystals were dissolved in a small quantity of methanol by gentle warming and the solution was diluted with absolute ether, whereupon there separated a crystalline precipitate of methyl 5-dimethylaminomethylcyclopentanone-3-carboxylate hydrochloride; yield 1.6 g., M.P. 138–140° C. (dec.). The crude crystals were redissolved in absolute methanol containing hydrogen chloride and recrystallization by addition of absolute ether gave colorless needles melting at 143–143.5° C. (dec.).

*Analysis.*—Found: C, 50.84; H, 7.29; N, 5.80. Calculated for $C_{10}H_{18}O_3NCl$: C, 50.95; H, 7.64; N, 5.95%.

(3) PREPARATION OF METHYL 5-METHYLENECYCLO-PENTANONE-3-CARBOXYLATE (IV)

A sample of 0.7 g. of methyl 5-dimethylaminomethylcyclopentanone-3-carboxylate hydrochloride (II) was placed in a small round-bottom flask and heated at 145–150° C. in an oil bath under highly reduced pressure (0.005 mm. Hg). Colorless crystals of methyl 5-methylenecyclopentanone-3-carboxylate were obtained in a receiver cooled in a dry ice-acetone bath; M.P. 24–27° C., yield 0.35 g. (76%). On standing at room temperature in the absence of polymerization inhibitor, this compound gradually polymerized and became less soluble in methanol or ethanol. The fresh product decolorized bromine in carbon tetrachloride rapidly.

*Analysis.*—Found: C, 62.34; H, 6.21. Calculated for $C_8H_{10}O_3$: C, 62.32; H, 6.51%.

Methyl 5 - methylenecyclopentanone - 3 - carboxylate showed a potency of 9.88 units/mg. (in 10% ethanol solution) against *S. aureus* 209–P and 11.2 units/mg. against *M. flavus*.

(4) PREPARATION OF 5-METHYLENECYCLOPENTA-NONE-3-CARBOXYLIC ACID (V)

A mixture of 997 mg. of freshly prepared methyl 5-methylenecyclopentanone-3-carboxylate (IV), 20 cc. of 1.5 N sulfuric acid and 3 mg. of hydroquinone (as an inhibitor) was stirred at 25–27° C. for three hours to give a clear solution, which was adjusted to pH 2.0 with a saturated solution of sodium bicarbonate and extracted with three 10 cc. portions of ethyl acetate. After the extract had been dried over sodium sulfate, the ethyl acetate was removed by distillation under reduced pressure at 30–35° C. to yield 5-methylenecyclopentanone-3-carboxylic acid, a pale-yellow liquid; yield 751 mg. (83%). On standing at room temperature in the absence of inhibitor, this compound polymerized and gradually decreased in the antibacterial activity.

A freshly prepared sample of V was dissolved in a small quantity of water, neutralized with sodium bicarbonate and washed with ethyl acetate. Acidification and extraction with ethyl acetate followed by evaporation of the solvent in vacuo yielded colorless needles of V melting at about 67–74° C.

*Analysis.*—Found: C, 59.60; H, 5.81. Calculated for $C_7H_8O_3$: C, 59.99; H, 5.75%.

The infrared spectrum of purified 5-methylenecyclopentanone-3-carboxylic acid (V) showed a peak at $6.09\mu$ which is characteristic of the exocyclic methylene group in sarkomycin and had a conjugated carbonyl band at $5.84\mu$.

The ultraviolet spectrum of V in methanol showed the presence of $\alpha,\beta$-unsaturated ketone at 231 m$\mu$ (log $\epsilon$ 3.76).

On neutralization of the substance with sodium bicarbonate (or sodium hydroxide) followed by vacuum-concentration at low temperature, a colorless powder of sodium 5-methylene-cyclopentanone-3-carboxylate is obtained.

The above-obtained 5-methylenecyclopentanone-3-carboxylic acid showed significant, antibacterial and antifungal activities as follows:

Antibacterial and antifungal activities:
```
    Staphyllococcus aureus_____unit 1/mg__  12
    Micrococcus flavus_____unit 1/mg__   9
    Candida albicans_____mcg./cc__   50
```
1 In terms of sarkomycin unit.

Experimental results which were obtained to establish the chemical structure of 5-methylenecyclopentanone-3-carboxylic acid (V) are as follows:

(1) PREPARATION OF METHYL 5-DIMETHYLAMINO-METHYLCYCLOPENTANONE-3-CARBOXYLATE (III′)

To a mixture of 710 mg. of methyl 5-dimethylaminomethylcyclopentanone-3-carboxylate hydrochloride (II) and 5 cc. of chloroform was added 2.46 cc. of 1.23 N ammonia-chloroform solution, whereupon ammonium chloride immediately precipitated. The chloroform-layer containing the free ester-amine was separated and concentrated under reduced pressure. The oily residue was distilled in vacuo to give methyl 5-dimethylaminomethyl-cyclopentanone-3-carboxylate, B.P. (bath temp.) 78–85° C. (0.1 mm. Hg); yield 135 mg. The product had a weak smell of amine and was insoluble in water, soluble in dilute hydrochloric acid.

The reaction of III′ with excess methyl iodide was exothermic and immediately afforded a crystalline methiodide melting at 213° C. (dec., sintered at 145° C.) in a quantitative yield.

*Analysis.*—Found: N, 3.91. Calculated for $$C_{22}H_{20}O_8NI: H, 4.11\%$$

(2) HYDROGENATION OF METHYL 5-METHYLENECYCLOPENTANONE-3-CARBOXYLATE (IV→VI→VII→VIII)

A solution of 335 mg. of freshly prepared methyl 5-methylenecyclopentanone-3-carboxylate (IV) in 2.5 cc. of methanol was shaken with 30 mg. of platinum oxide and hydrogen; 59 cc. (32.2° C., 754 mm.) of hydrogen was absorbed in fifteen minutes. After filtration, the filtrate was concentrated under reduced pressure to give a pale-yellow liquid. Fractional distillation in vacuo gave 260 mg. (77%) of methyl 5-methylcyclopentanone-3-carboxylate (VI) of B.P. (bath temp.) 89–95° C. (s mm.).

A mixture of 558 mg. of methyl 5-methylcyclopentanone-3-caboxylate (VI) in 1.5 cc. of 10% sodium hydroxide solution was stirred at room temperature for one hour. The resulting solution was acidified to pH 2.6 by addition of 1.5 N sulfuric acid, saturated with ammonium sulfate and then extracted with ether. After the extract was dried over sodium sulfate, the ether was removed by distillation. Fractional distillation of the residue in vacuo gave a viscous liquid of 5-methylcyclopentanone-3-carboxylic acid (VII), B.P. (bath temp.) 125–130° C. (0.3 mm.); yield 340 mg. (66.8%). The 2,4-dinitrophenylhydrazone (VIII) prepared by the general procedure melted at 141–143° C. and did not depress the authentic sample of the 2,4-dinitrophenylhydrazone of the 5-methylcyclopentanone-3-carboxylic acid which was prepared by the synthetic route of Hope and Perkin.

(3) HYDROGENOLYSIS OF METHYL 5-DIMETHYLAMINOMETHYLCYCLOPENTANONE - 3 - CARBOXYLATE (III′→VI→VII)

A solution of 135 mg. of III′ in 1.5 cc. of methanol was shaken with 15 mg. of platinum oxide and hydrogen; 25 cc. (26° C., 754.4 mm. Hg) of hydrogen was absorbed in twenty minutes. After filtration, the filtrate was concentrated under reduced pressure to give a crude product of methyl 5-methylcyclopentanone-3-carboxylate (VII), a fragrant liquid; yield 95 mg.

The whole quantity of the crude product was hydrolyzed with 10% sodium hydroxide solution at room temperature and after-treatment was carried out just as described above in the hydrolysis of VI. A crude product of 5-methylcyclopentanone-3-carboxylic acid was obtained; yield 45 mg. This was converted to the 2,4-dinitrophenylhydrazone, M.P. 139–142° C., which did not depress the authentic sample of 2,4-dinitrophenylhydrazone of 5-methylcyclopentanone-3-carboxylic acid.

Mannich base salt (III) can be prepared also by a reverse route of the above-described synthesis, that is to say, in the first place, I is esterified to give the ester of I, and then to the latter the Mannich reaction is applied to give III.

I claim:

The stepwise process of reacting an acid having the formula

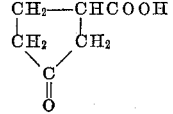

with formaldehyde and a secondary amine in a Mannich reaction, esterifying the resultant acid to produce a lower alkyl ester, heating the ester in vacuo to distill a 5-methylene-cyclopentanone-3-carboxylic acid ester and subsequently hydrolyzing said ester to produce the corresponding acid having the formula

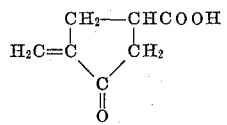

wherein $R_1$ and $R_2$ represent hydrogen.

References Cited in the file of this patent

"Organic Reactions," I, 318, 334, 335, J. Wiley, 1942.
Hooper et al.: Antibiotics and Chemotherapy, 5, 587–90 (1955).
Hara et al.: J. Antibiotics, Ser. A., IX, 191–2 (1956).
Umezawa et al.: Chem. Soc. Japan. Bull., vol. 30, pp. 267 to 271 (1957).

UNITED STATES PATENT OFFICE
CERTIFICATE OF CORRECTION

Patent No. 3,037,053　　　　　　　　　　　　　　　　　　May 29, 1962

Sumio Umezawa

It is hereby certified that error appears in the above numbered patent requiring correction and that the said Letters Patent should read as corrected below.

Column 2, line 43, for "Herting" read -- Heating --.

Signed and sealed this 9th day of October 1962.

(SEAL)
Attest:

ERNEST W. SWIDER
Attesting Officer

DAVID L. LADD
Commissioner of Patents